US006863971B2

(12) United States Patent
Halahmi et al.

(10) Patent No.: US 6,863,971 B2
(45) Date of Patent: Mar. 8, 2005

(54) STRONG DURABLE LOW COST COMPOSITE MATERIALS MADE FROM TREATED CELLULOSE AND PLASTIC

(75) Inventors: Izhar Halahmi, Hod Hasharon (IL); Mike Gross, Hod Hasharon (IL); Ian Leonard Jacobs, Zichron Yaacor (IL); Gaby Kadosh, Kiryat Shinonah (IL)

(73) Assignee: Cycletec Ltd., D. N. Hefer (IL)

( * ) Notice: Subject to any disclaimer, the term of this patent is extended or adjusted under 35 U.S.C. 154(b) by 0 days.

(21) Appl. No.: 10/102,205

(22) Filed: Mar. 21, 2002

(65) Prior Publication Data

US 2003/0046772 A1 Mar. 13, 2003

Related U.S. Application Data (63) Continuation-in-part of application No. 09/813,876, filed on Mar. 22, 2001, now abandoned.

(51) Int. Cl.⁷ .............................................. D21H 11/00
(52) U.S. Cl. ................... 428/311.71; 428/311.11; 428/311.51; 428/317.9; 428/292.1; 428/295.1; 527/103; 527/301; 524/534; 521/109.1; 521/84.1
(58) Field of Search ..................... 428/311.11, 311.51, 428/311.71, 317.9, 292.1, 295.1; 527/103, 301; 524/534; 521/109.1, 84.1

(56) References Cited

U.S. PATENT DOCUMENTS

| | | | |
|---|---|---|---|
| 4,376,144 A | 3/1983 | Goettler ........................ 428/36 |
| 4,382,136 A | * 5/1983 | Blount ........................ 527/305 |
| 4,623,499 A | * 11/1986 | Fuma et al. .................. 264/83 |
| 4,791,020 A | 12/1988 | Kokta ........................... 428/32 |
| 5,140,086 A | 8/1992 | Hunter et al. ............... 527/103 |
| 5,380,695 A | * 1/1995 | Chiang et al. .............. 503/227 |
| 5,439,969 A | * 8/1995 | Sanduja et al. ............. 524/534 |
| 5,973,035 A | 10/1999 | Medoff et al. ................ 524/13 |
| 6,066,680 A | 5/2000 | Cope ............................ 521/79 |
| 6,103,790 A | 8/2000 | Cavaille et al. .............. 524/13 |
| 6,117,545 A | 9/2000 | Cavaille et al. ............. 428/357 |
| 6,414,048 B1 | * 7/2002 | Sanduja et al. ............... 522/42 |

FOREIGN PATENT DOCUMENTS

| | | |
|---|---|---|
| GB | 1042703 | 9/1966 |
| WO | WO 98/03586 | 1/1998 |

OTHER PUBLICATIONS

Translation of JP 2000–119509, Nakagawa Shinji, Apr. 25,2000 6 Pages.*

Guoglang Qlan et al., Nanocor Inc., Technical Papers, Preparation amd Properties of Polyolefin Nanocomposites, Polyolefins 2001, Houston, TX, Feb. 25–28, 2001, pp. 1–5.

(List continued on next page.)

*Primary Examiner*—Terrell Morris
*Assistant Examiner*—Hai Vo
(74) *Attorney, Agent, or Firm*—Fleshner & Kim, LLP (57) ABSTRACT

The present invention concerns treated fibrous porous material having a defined nanostructure comprising reactive sites thereon, wherein said fibrous porous material is treated with a low viscosity organic solution comprising organic solvent, isocyanate component unsaturated resin and optionally additional additives. The treated fibrous porous material is further mixed with a resin to form a composite. The composite may be formed by various methods of mixing and molding. The invention is further directed to various composites made therefrom. The fibrous porous material is selected from the group comprising cellulose, lignin, synthetic ceramics, porous metal nanopowders, kaolin, bio fibers and porous powders of biological origin or their mixtures. The resin may be any polymer virgin or scrap obtained from industrial or domestic waste, and is selected from thermoplastic or thermosetting polymers.

18 Claims, 8 Drawing Sheets

OTHER PUBLICATIONS

Peter L. Maul, Nanocor Incorporation, Technical Papers, Plastic Nanocomposites: The Concept Goes Commercial, Plastic Fair '99, Rosemont, IL Jun. 15–17th, 1999, pp. 1–7.

Datta Sudin et al., Polymeric Compatibilizers, Uses and Benefits in Polymer Blends, Sycle–Tec, No. 2532, Sep. 25, 2001, pp. 1–6.

Eastman Publication APG 10, Epolene Maleated Polypropylenes, Superior Coupling Additives for Wood Reinforcement.

Eastman Publication APG 10, Epolene Maleated Polyolefins, Superior Coupling Additives for Cellulose Reinforcement.

Tailoring Surfaces With Silanes, Chemtech, Dec. 1977, pp. 766–778.

Andrzej M. Krzysik et al., "Wood–polymer bonding in extruded and nonwoven web composite panels," Wood Adhesives 1990: Proceedings of a symposium, Madison, WI: Forest Products Research Society, pp. 183–189.

Mohan Krishnan et al., "Compatibilization of Biomas Fibers with Hydrophobic Materials," Mat. Res. Soc. Symp. Proc., vol. 266; 1992, pp. 93–104.

Rajeev Karnani et al., "Biofiber–Reinforced Polypropylene Composites," Polymer Engineering and Science; Feb. 1997, vol. 37, No. 2, pp. 476–483.

International Search Report dated Jan. 17, 2003.

Database Chemabs Online, Chemical Abstracts Service, Columbus, Ohio, USA; Database Accession No. 132:294874, XP002223541 (Abstract and JP 2000 119509 A, Apr. 25, 2000.

* cited by examiner

STRONG DURABLE LOW COST COMPOSITE MATERIALS MADE FROM TREATED CELLULOSE AND PLASTIC

This application is a continuation-in-part of application Ser. No. 09/813,876 filed Mar. 22, 2001 now abandoned.

FIELD OF THE INVENTION

This invention relates to composite materials. More specifically it relates to composite materials made from cellulose fibers and plastic matrix.

BACKGROUND OF THE INVENTION

Organic composites are built from polymeric matrix and solid, hard particulate or fibrous reinforcement. Typical reinforcing materials are inorganic fillers such as silica, talc, alumina, glass spheres, calcium carbonate, ceramic powders, silicon carbide, inorganic fibers such as glass, carbon, ceramic, boron and organic fibers such as kevlar, cellulose, lignin, and nylon. When the particles of the added solid material are small enough and are compatible with the polymeric matrix, the properties of the mixture are nonlinear, due to the interaction polymer-particle on the molecular level (Peter L. Maul, Nanocor Incorporated Corporate Technical Center, Arlington Heights, Ill. USA, in "Plastic nanocomposites: the concept goes commercial. Such composite materials are termed nanocomposites and exhibit better strength and order (permeability, orientation etc.).

In order to stabilize the composition of polymer matrix and additives some mediating agent is necessary. Surfactants are known to stabilize solutions composed of immiscible solvents. The same phenomenon occurs in polymers where polymers of different molecular structure upon mixing together by melting or in solution, tend to separate into multi-phase structure resulting in a mixture having inferior physical properties compared to the original polymer components. In order to mix together mixtures of different polymers (having different basic repeating units, molecular weight, branching rate, polymers which differ in their end and pendant groups or in the nature of stereoisomerism, polymers with a different degree of crosslinking or of acid-base interactions), surfactants-like entities should be added to the polymeric mixture. These surfactant-like entities known as compatibilizers, stabilize the polymeric blend and give rise to improved mechanical, physical and chemical properties of the blend. The added compatibilizers which are polymeric, stabilize the phases and enable creating stable, homogeneous multi-phase compositions, with good stress transfer between phases, with practical value (Datta Sudhin, Loshe David J. Polymeric compatibilizers—uses and benefits in polymer blends., Hanser Publishers 1996). Compatibilizers, in addition to stabilizing polymer-polymer interactions, further serve at polymer-filler interface (Eastman publication APG-10, July 1998), and especially in polymer-cellulose interface (Andrzej M. Krzysik and others, "Wood-polymer bonding in extruded and nonwoven web composite panels"). In the case where a hydrophilic filler or reinforcement like cellulose is mixed together with a hydrophobic matrix (e.g. polyethylene or polypropylene) the presence of the compatibilizer is crucial. In such a case, the compatibilizer blocks the hydroxyl groups and seals the surface of the particle (U.S. Pat. No. 6,117,545; M. Krishnan & R. Narayan "Compatibilization of biomass fibers with hydrophobic materials" Mat. Res. Soc. Symp. Proc. (1992) 266, 93–104) The disadvantage of compatibilizers limiting their use is their relatively high price and high viscosity. Furthermore, the high viscosity dictates that they be mixed only in high-shear/high-temperature equipment (extruder for example). The process of incorporating it into the complicated mixture is energy and time consuming and the targeting of the compatibilizer to a specific surface is limited. Also their formulation is very sensitive to processing conditions, and their treatment is limited to the outer surface of particles and fibers, a severe drawback when dealing with porous particles. One more drawback that it is very difficult to target these additives to specific surface and thus high percentage of the additive is consumed on irrelevant surfaces/fillers pores.

Combinations of compatibilizer and nano or microscopic porous fillers are problematic due to the high surface area of the filler.

Another approach to stabilize a composition of polymer(s) and additives may be the use of coupling agents. These agents, unlike compatibilizers that encapsulate the particle/polymer phase, are low molecular weight reactive molecules that have multifunctionality that enable the chemical bridging between solid and polymer (Tailoring Surfaces with Silanes", Chemtech, Vol. 7, 766–778, 1977). The mode of action of the coupling agents is by forming covalent/ionic bonds to the different components. Their advantages are: good penetration into porous materials, high reactivity, inorganic compatibility, ease of application utilizing relatively low cost mixing equipment. However, they are volatile (imparing economic and environmental problems), and tend to migrate from interfaces—thus being poor compatibilizers. In addition, their chemical reactivity spectrum is rather limited.

Pretreatment of cellulosic fillers by low molecular weight reactive monomers and olygomers are described in M. Krishnan & R. Narayan "Compatibilization of biomass fibers with hydrophobic materials" Mat. Res. Soc. Symp. Proc. (1992) 266, 93–104, and in Rajeev Karnani et al., "Biofiber-Reinforced Polypropylene Composites" Polymer Eng. & Sci. (1997) 37, 476–483. The prior art use simple but relatively expensive ingredients like isocyanates or silanes. The mechanical properties of the result interface are brittle and the design flexibility in properties is limited. Cellulosic fiber composites and nanocomposites are described for example in U.S. Pat. No. 6,103,790—"Cellulosic microfibril reinforced polymers and their application", U.S. Pat. No. 5,973,035—"Cellulosic fiber composites", and U.S. Pat. No. 6,066,680—"Extrudable composite of polymer and wood flour".

SUMMARY OF THE INVENTION

The present invention is based on a novel concept for binding a fibrous porous material and a polymer to yield a composite material. In accordance with the invention a fibrous porous material is treated to form an interfacing component on said fibrous porous material which can then bind to the polymer. As a result of the treatment, active sites that can absorb moisture are blocked and a tight, strong and water impermeable composite product is thus obtained.

The present invention provides a treated fibrous porous material prepared from an untreated porous fibrous material, the untreated material comprising original reactive sites, the treated material being characterized in that:

(i) it has a reduced number of original reactive sites as compared to the untreated material;
(ii) it has a reduced surface area; and
(iii) it has a higher nitrogen content as compared to the untreated material.

In accordance with one preferred embodiment, the treated fibrous porous material has a high content of aromatic groups compared to the untreated product. The aromatic groups are preferably phenyl groups, typically forming part of styrene polymer, oligomer or cross linked network that is bound to the treated fibrous product.

Typically, the original reactive sites in the fibrous porous material are bound to an isocyanate component, which is a mono- or poly-isocyanate oligomer. In accordance with one embodiment, the mono- or poly-isocyanate groups are bound to an unsaturated polyester resin.

The treated fibrous product may be cellulose, lignin, lignocellulose natural fibers, synthetic ceramics, porous metal nanopowders, kaolin, bio fibers and porous powders of biological origin or mixtures thereof. A porous material that is cellulous-based natural material is a preferred embodiment of the invention. The cellulose may be in the form of wood chips, recycled paper, paper chips or powder, sawdust or mixtures thereof. According to one embodiment, the cellulose is a newsprint paper.

The treated fibrous porous material may be obtained from an untreated porous fibrous material by treating the untreated material with low viscosity organic solution that comprises an organic solvent selected from aromatic, aliphatic, ether, ester, ketone, halogenated solvent or alcohol, an isocyanate component being, a mono- or poly-isocyanate and an unsaturated resin. The unsaturated resin is typically hydroxyl, epoxy or carboxyl containing polyester, which may be aromatic. The organic solution may further comprise one or more compounds selected from the group consisting of styrene which can be an oligomer or polystyrene, vinyl monomer, organosilanes, organotitanium and organozirconium and an organic peroxide.

The invention also provides a method of treating a fibrous porous material having original reactive sites, the method comprising mixing said fibrous porous material with a low viscosity organic solution, said low viscosity organic solution comprising an organic solvent selected from aromatic, aliphatic, ether, ester, ketone, halogenated solvent or alcohol, an isocyanate component being a mon- or poly-isocyanate and an unsaturated resin. The unsaturated resin is typically hydroxyl, epoxy or carboxyl containing polyester, which may be aromatic. The organic solution may further comprise one or more compounds selected from the group consisting of styrene which can be an oligomer or polystyrene, vinyl monomer, organosilanes, organotitanium and organozirconium and an organic peroxide.

The invention still further provides a composite material that comprises a porous fibrous material; a polymer; and interfacing component comprising at least one nitrogen-containing agent covalently bound to said porous fibrous material and to said polymer, whereby said fibrous material in said composite comprises a higher content of nitrogen as compared to identical fibrous material of a composite made of said identical fibrous material and said polymer without said component.

The nitrogen-containing agent in said composite material is typically comprised of mono or poly-isocyanate. The mono- or poly-isocyanate is typically bound to a polyester resin.

In accordance with a preferred embodiment of the invention, the composite material is also characterized in that the interfacing component comprises also an agent that has aromatic groups, whereby the fibrous material in said composite material comprises a higher content of aromatic groups as compared to an identical fibrous material of a composite material that is made from the identical fibrous material and the polymer but without said interfacing component. Said agent with aromatic groups is typically an automatic resin such as polystyrene.

In accordance with another preferred embodiment, said component is comprised also a polyester resin, for example, hydroxyl, epoxy or carboxyl containing polyester.

The polymer in the composite material may be one or more of the group consisting of thermoplastic or thermosetting polymers, their mixtures or multilayered or multicomponent products or mixtures thereof.

Examples of the polymer are one or more of the group consisting of polyethylene and copolymers thereof, polypropylene and copolymers thereof, polystyrene and copolymers thereof, polycarbonate, silicones and copolymers thereof, polybutylene or polyethyleneterphthalate, polyurethane, epoxy, unsaturated polyesters, vinyl esters and ethers, acrylic resins and copolymers thereof, polyamides, phenolics, amino resins, alkyds, polyimides, polyethers, polyvinyl chloride and copolymers thereof, nylon and mixtures thereof.

A suitable source for said polymer is industrial or domestic waste.

The present invention also provides a method for preparing a composite material comprising a fibrous porous material and a polymer, the method comprising:

(i) mixing said fibrous porous material with a low viscosity organic solution, said low viscosity organic solution comprising an organic solvent selected from aromatic, aliphatic, ether, ester, ketone, halogenated solvent or alcohol, an isocyanate component being a mono- or poly-isocyanate and an unsaturated resin, wherein the unsaturated resin is typically hydroxyl, epoxy or carboxyl containing polyester, which may be aromatic, to yield a treated fibrous material;
(ii) mixing said dried treated material with the polymer;
(iii) heating the mixture to melt said polymer; and
(iv) shaping the molten composition into a desired form.

The present invention also provides a method for preparing a composite material where a drying process precedes the step of mixing the treated fibrous porous material with a polymer.

The present invention also provides a product made from the composite material of the invention or prepared by the above method for preparing such a composite material. Said product may be an extruded beam, tube or profile, a preformed sheet or may be in the form of pellets. The product of the invention may be formed into a variety of different finished products, non-limiting examples being plate, board, transportation pellet, a film, an automotive interior trim or a construction element. Additionally, the finished product of the invention may also be in the form resembling that of paper, in the form of natural fibers or plastic, may be in the form resembling old corrugated cardboard, may be in the form of white brown paper or may be prepared in the form to resemble wood.

The present invention further provides a preform manufactured from said composite, by shaping into a mold, roll or a continuous belt to yield a sheet made of said composite material.

The present invention also provides a preform manufactured from the composite of the invention, by impregnating said composite into woven or non woven fabric, to yield a sheet made of said fabric and said composite material. Examples of such a fabric may be a fabric consisting of glass, ceramic material, kevlar, carbon, metal, nylon, cellulose-based material, in a mold, rolls or continuous belt.

The present invention further provides a composite structure that is manufactured by heating said preform to a softening point, e.g. a temperature between about 130° C. to about 230° C., and then pressing the pre-heated sheet in a mold, namely in a compression molding fashion.

The invention also provides a system for carrying out the above-defined methods. The system for carrying out the method for treating the porous fibrous material comprises at least one sub-system for reacting said fibrous material with said organic solution and at least one sub-system for removing the solvent and drying said fibrous material.

The system for carrying out the method for preparing said product, comprises a sub-system for carrying out process steps (ii)-(iv) as defined above, typically as an extrusion system.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The invention will now be described with reference to some non-limiting specific embodiments. The invention will first be illustrated in reference to the attached drawings to be followed by a more detailed description below.

Figure 1:
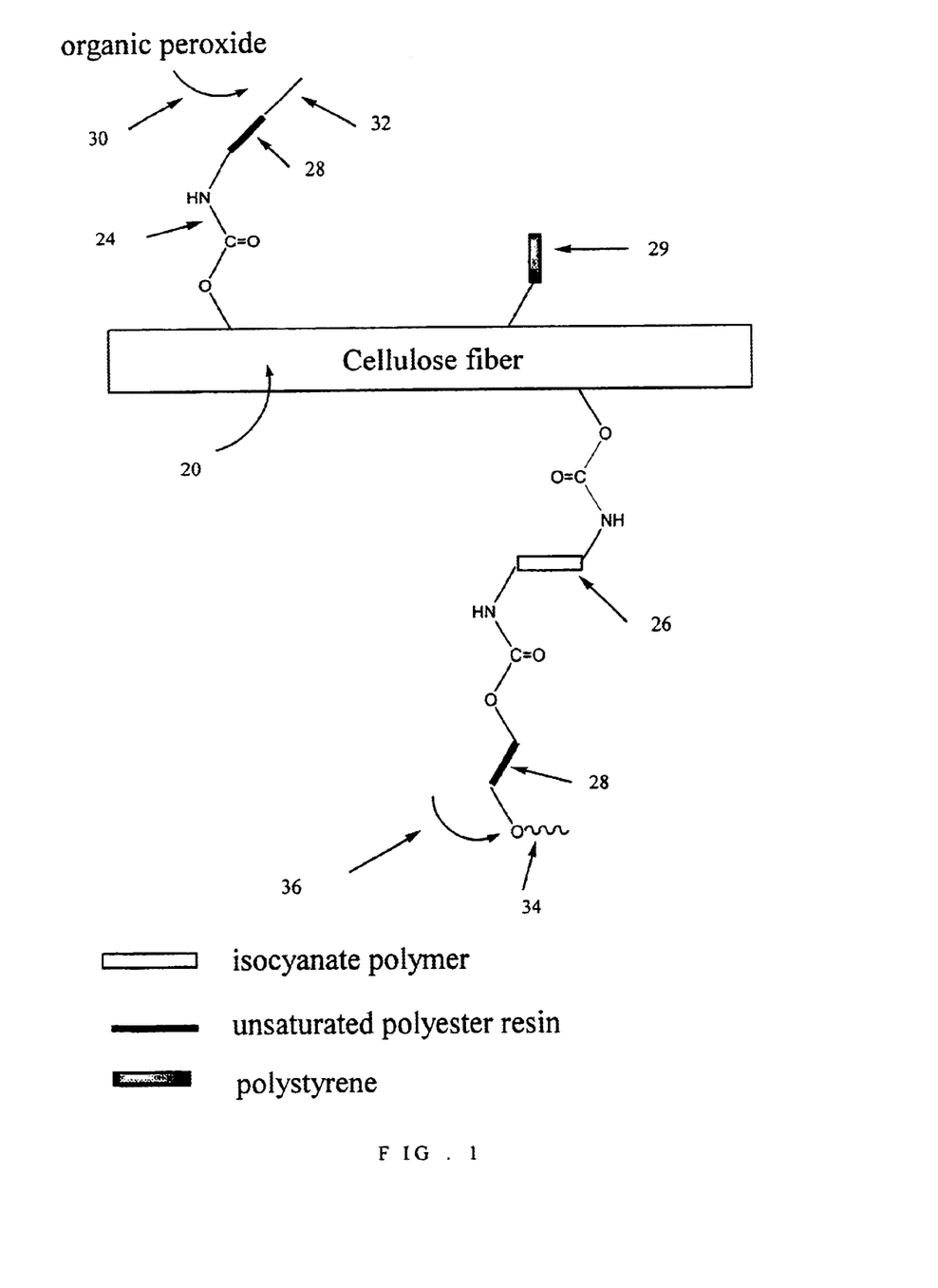
FIG. 1 is a schematic representation of a cellulose fiber treated in accordance with the invention.

Reference is fist being made to FIG. 1, which is a schematic representation of a cellulose fiber 20 treated in accordance with the invention. The cellulose fiber has a plurality of original reactive sites, that in this case are hydroxyl groups, which if left free may absorb moisture. By reacting a cellulose fiber with mono-isocyanate group 24 or a poly-isocyanate group 26, the isocyanate residues bind to the hydroxyl groups. The mono-isocyanate 24 or the poly-isocyanate group 26 can also bind a resin, such as an unsaturated polyester resin 28. In this way these reactive sites assist in the subsequent binding of the fiber to a polymer.

Use, in accordance with a preferred embodiment of the invention, is also made by an aromatic resin such as polystyrene 29 which has an affinity to the lignin phase of the fiber and binds thereto by affinity association. The aromatic resin can also bind to the polymer matrix.

The polyester resin can react with polymers by the assistance of an organic peroxide, as represented by arrow 30, to yield additional reactive groups on the polyester resin. The polyester resin can bind to polymers represented by straight line 32 and wavy line 34. It should be noted that while reaction assisted by an organic peroxide increases the number of reactive groups that can bind to a polymer, the unsaturated polyester resin can also bind to the polymer even without first reacting it with the organic peroxide. The polyester may react with condensation polymers via transesterification or transamidation as represented by arrow 36.

Figure 2A:
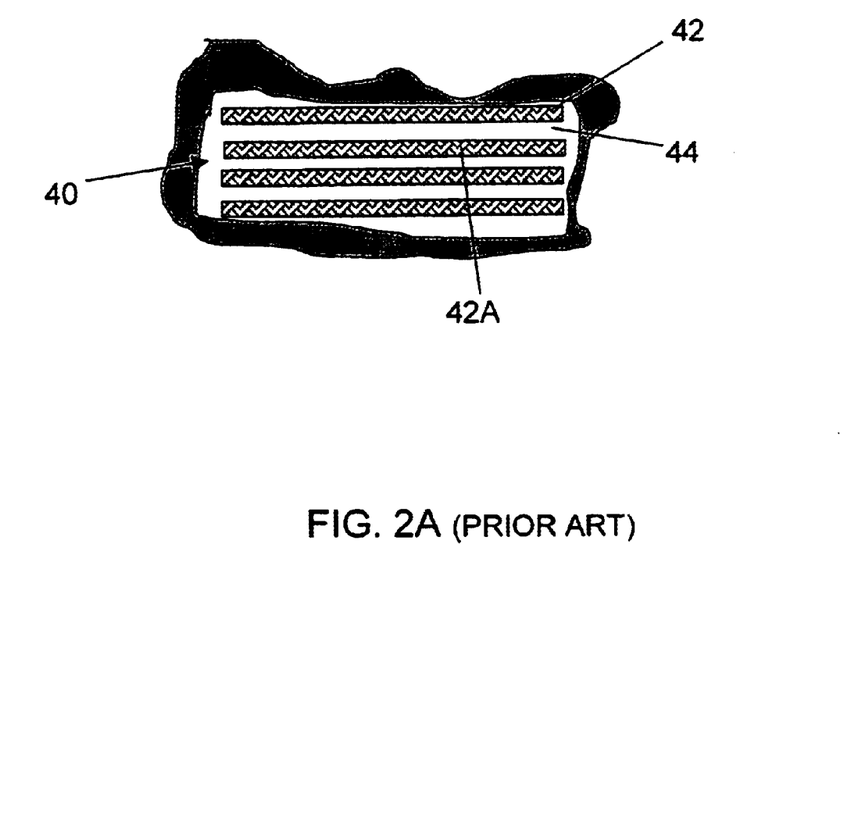
FIGS. 2A and 2B are schematic representations of the resulting microscopic structure obtained by the present invention (FIG. 2B) as compared to the structure obtained by using prior art compatibilizers (FIG. 2A).
Figure 2B:
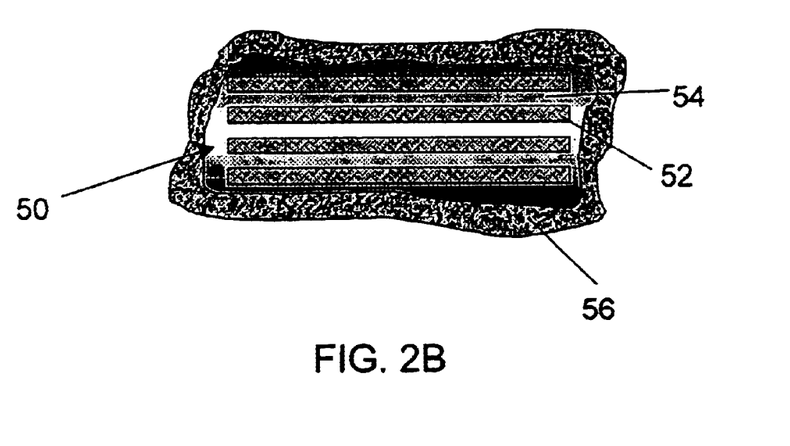

Reference is now being made to FIG. 2A and FIG. 2B showing a composite material prepared in accordance with the prior art (FIG. 2A) and such prepared in accordance with the invention (FIG. 2B). As seen in FIG. 2A, a fibrous product, generally designated 40 consists of a number of fibrils 42 and pores 44 between them. The compatibilizers that are used in accordance with the prior art are very viscous and thus only coat the outer face of the fibrous particle 40 to yield a coating 46 and do not penetrate into the pores 44. Thus, by way of example, fibril 42A, in the particle's interior, is not bound to the compatibilizers, and consequently will also not be bound to the polymer, it will absorb humidity and the internal structure will have no mechanical contribution to the composite material.

In contrast, in accordance with the invention, the treating organic solution has a low viscosity and can penetrate all the pores 54 within the fibrous particle 50. Thus, in addition to a coating polymeric phase 56, which bonds the external surface of the particle, all the internal fibrils 52 are bound to a polymeric phase as well. In this way, in addition to increased strength, the sites that can otherwise absorb moisture are thereby blocked.

The fact that each reactive group in the fibrous porous material may play a role in bonding to the polymer, may be used to advantage in order to achieve stronger composite material and also to advantage in binding together non compatible polymers. This is illustrated schematically in the FIG. 3. Bound to fibrous porous fiber 60 are a plurality of pendant groups, each of which is covalently bound through an isocyanate group (urethane, allophanate or biuret linkage) (see FIG. 1) to the hydroxyl residue of the fibrous backbone. In this example, there are two different groups, 62 and 64. 62 can bind, by forming a bond 62A with a polymer 68 while groups 64 can bind through bond 64A with polymer 68. Thus, when mixing these two different polymers together, a composite material is formed with these two polymers that are held together in a single matrix by the pretreated fibrous porous material. It should be noted that without such a fiber polymer 66 and 68 would not bind to one another.

Figure 3:
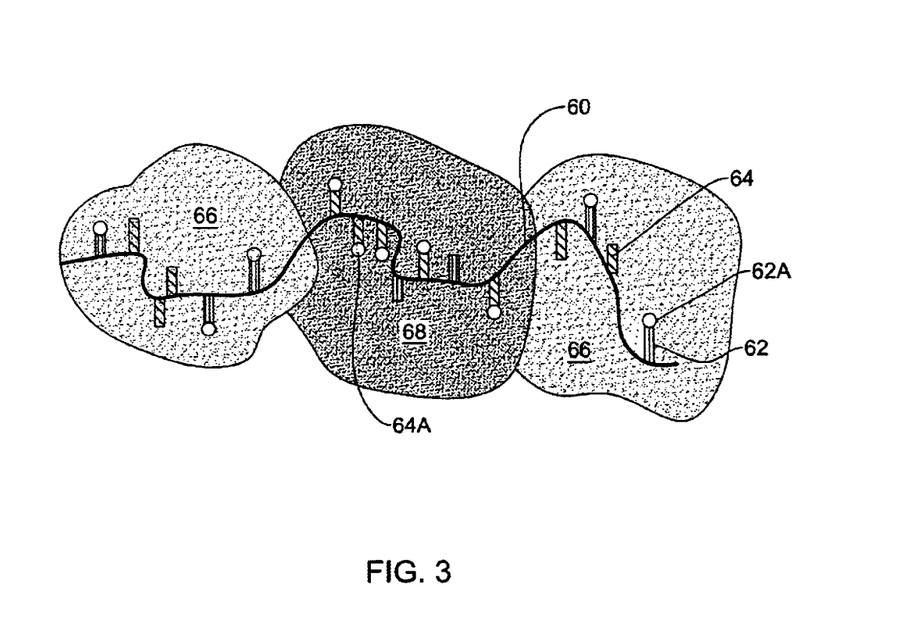
FIG. 3 is a schematic representation of the microscopic structure of a portion of a composite material in accordance with an embodiment of the invention.

In accordance with the prior art, where the compatibilizer coats the entire external surface of the fiber, and the compatibilizer is soluble in the polymer phases, the ability to use fibers to bond together different polymers, is more limited. Thus, a composite material prepared with different polymers in accordance with the prior art will be less strong than that prepared in accordance with the invention.

In the following, some embodiments of methods in accordance with the invention will be described. In these embodiments, the starting materials are different forms of paper. It should however be appreciated that the invention is not limited thereto.

Figure 4:
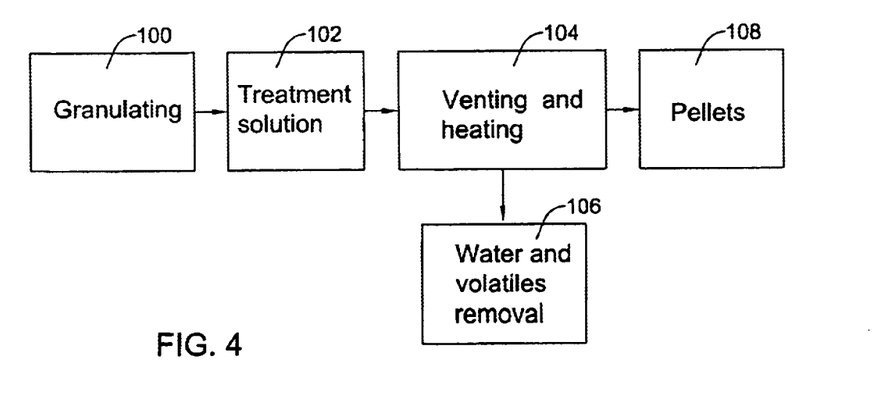
FIG. 4 is a flow chart describing one embodiment of a method in accordance with the invention.

Reference is first being made to FIG. 4, At a first step 100, paper is granulated into chips with a typical diameter of about 0.5 to about 5 mm. Granulation may be done as known per se. At a next step 102, a treatment solution, which is a low viscosity organic solution that comprises mono- or poly-isocyanate, organic solvent in an unsaturated resin is sprayed onto the paper. A typical example is the solution referred to below as CCA, which includes the aforementioned ingredients as well as styrene and organic peroxide. It should be noted that the styrene and organic peroxide are not essential although their inclusion is preferred. Other agents that may be included in the treatment solution are vinyl, organosilanes, organotitanium or organozirconium. In addition to spraying, the treatment solution may be applied in a variety of different ways such as simple soaking, atomizing, etc.

Optionally, the treated paper may then be dried although this is not essential. In a next step, one of four, the treatment paper is mixed with a polymer and heated. The mixing and heating apparatus should be provided with large venting openings to allow release of humidity and solvents that are removed at 106. The resulting products are formed into pellets that are paned at 108 which can then be used for further processing by sheet rolling, in-line molding, or by injection molding. The resulting product can be shaped into sheet or tube or profile.

Figure 5:
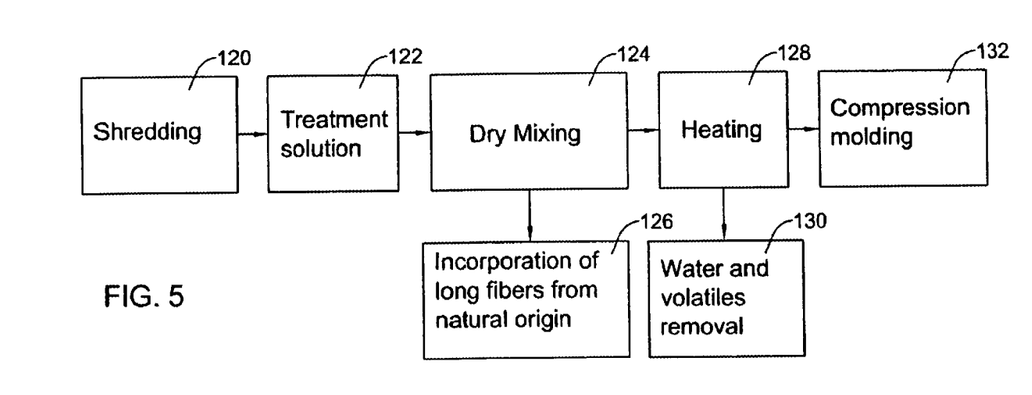
FIG. 5 is a flow chart of a method in accordance with another embodiment of the invention.

Reference is now being made to FIG. 5 showing another embodiment of a method in accordance with the invention. At a first step 120, paper is shredded into chips of a size between about 0.5 to about 5 mm and then treated with a treatment solution at 122, similarly as 102 in FIG. 4. The treated paper is then dried and then the solution should be for day mixing at 124 with a plastic material in a mixture to form a flat mat. During this process short fibers from a natural origin are admixed as represented by a block 126. At a next step 128, the mixture is heated on a conveyor microwave or IR heater, and water and volatiles are removed, typically in line, as represented by block 130. The heated mixture is then suppressed to compression molding at 132 to yield a sheet made of a composite material.

Figure 6:
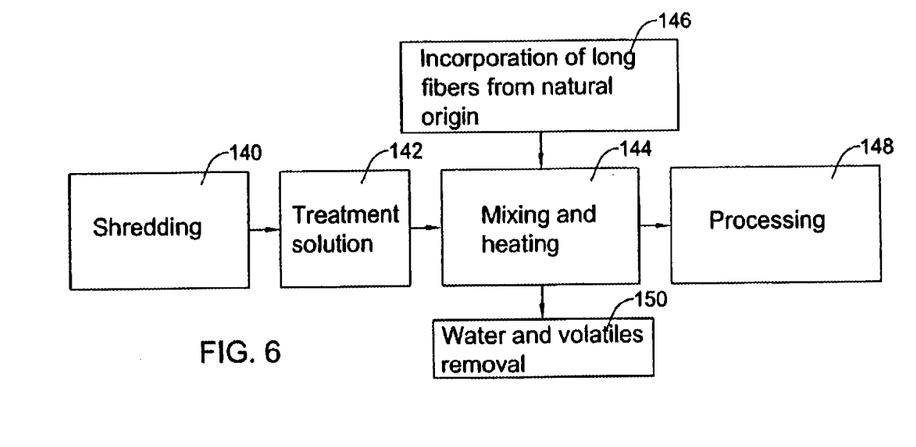
FIG. 6 is a flow chart of a method in accordance with a further embodiment of the invention.

Reference is now being made to FIG. 6. At a first step 140 brown paper or OCC (old corrugated cardboard) paper is first shredded into chips of a size of 0.5 to about 5 mm and then the chips are subjected to a treatment solution at 142 similarly as in step 102 of FIG. 4. The treated paper is then, at 144, mixed with a plastic material while admixing also long fibers from a natural origin, as represented by block 146. Water and volatiles are continuously removed, at 150. After mixing and heating at 144, the so-formed composite material may be, at 148, converted into pellets, profiles, subjected to sheet rolling, in-line molding or injection molding. In case of in-line molding or injection molding, the mixing and heating step 144 and the processing step 148 may be conducted continuously within an extruder.

Figure 7:
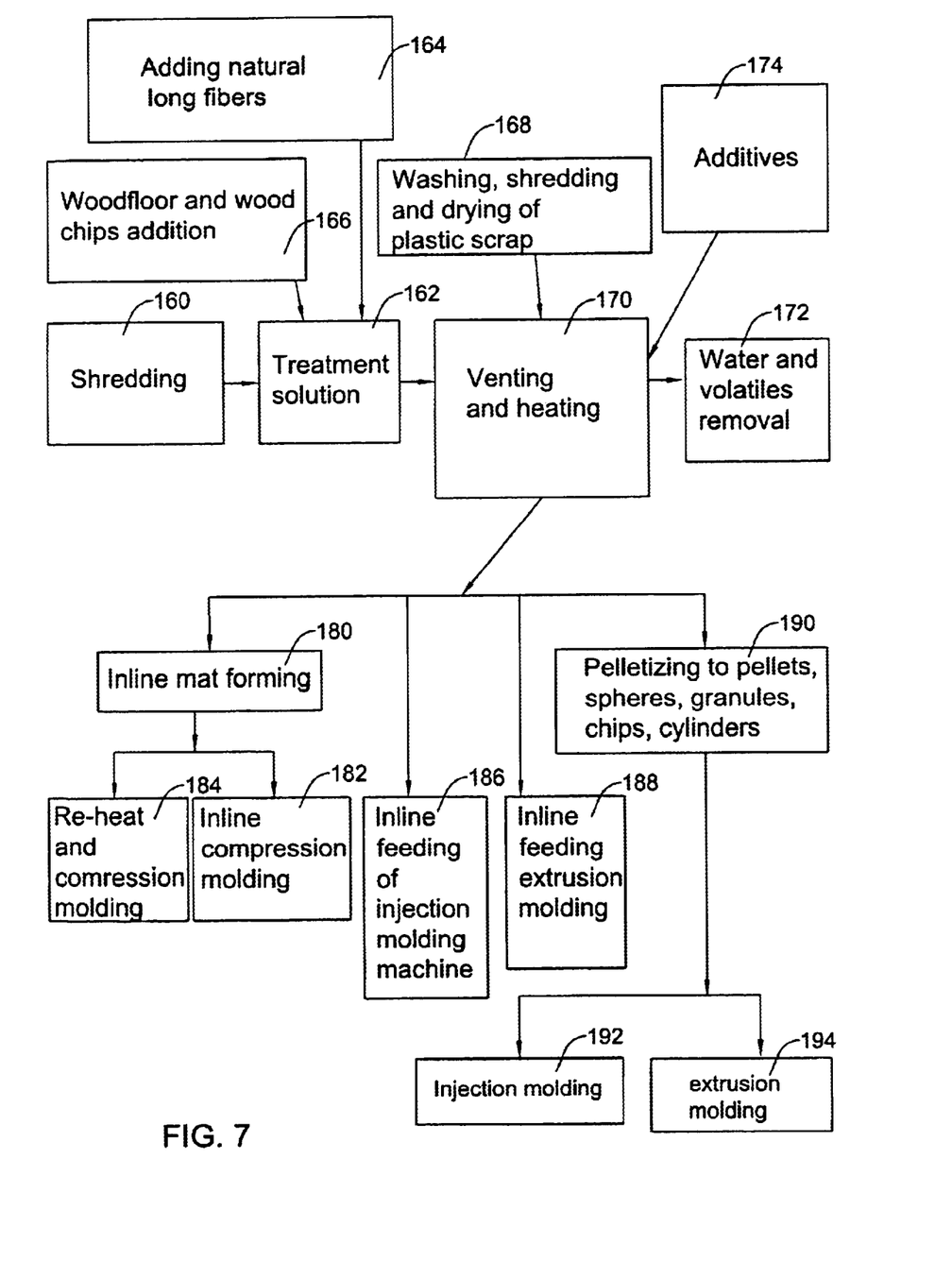
FIG. 7 is a flow chart of a method in accordance with a further embodiment of the invention.

Reference is now being made to FIG. 7. At a first step 160, newsprint paper, brown paper or OCC paper is first shredded into chips having a size of about 0.5 to about 5 mm. The shredded paper is then contacted with a treatment solution at 162 similarly as in 142 of FIG. 6. Natural fibers such as Hemp, Flax, Sizal, Kenaf, are added as represented by block 164, in order to impart extra strength and impact resistance to the subsequently formed composite material. In addition, wood form and wood chips may be added, as represented by block 166, to impart extra strength and better wood like look and feel to subsequently form composite material. The polymer material in this embodiment is virgin, domestic or industrial waste which is initially treated at 168 by washing, shredding and drying to yield chips having a diameter of about 0.5 to 15 mm. These washed, shredded and dried chips are then nixed with the shredded paper, and in addition natural fibers and the wood form or wood chips and all are mixed together at 170 in a heated vessel that has typically a big vending opening to allow removal of water and volatiles represented by block 172. Potentially, additives such as additional fibers, pigments, flame-retardants, fillers, stabilizers, and others may be added, as represented by block 174.

The heated mixture may then be subsequently processed in a number of different ways. In accordance with one embodiment, this material may then be subjected to in-line mat forming 180 and the so formed material may then be subsequently subjected to in-line compression molding 182 or may be reheated and only then subjected to compression molding as represented by block 184. Additionally, the material may be fed directly into an injection-molding machine 186 or a profile-extrusion machine 184.

By a further embodiment, the mixed and treated material obtained at 170 may be pelletized into a variety of different forms at 190 and these pellets may then be shipped and then fed into an injection molding machine 192 or an extrusion molding machine 194.

The present invention provides a treated fibrous porous material for use as a reactive additive for composite materials. The treated fibrous porous material serves as an additive for the manufacturing of composites. The untreated fibrous porous material has a defined micro/nanostructure with a high aspect ratio, good internal hydrolytic stability and high strength and modulus. The treated material has reactive sites such as but not limited to hydroxyls, acidic or basic groups, ethers, esters, epoxides, amines, mercaptans or reactive double bonds. These external reactive groups serve as coupling sites to different polymers and due to the high aspect ratio, stabilize different polymeric phases onto same fiber—thus "compatibilize" it in a unique combined mechanical/chemical compatibilization effect (FIG. 3). Such an untreated fibrous porous material may be selected from cellulose, lignin, lignocellulosic materials, synthetic ceramics, porous metal nanopowders, kaolin, bio fibers and porous powders of biological origin or their mixtures. Preferably, the porous material is cellulose or lignocellulose, which may be in the form of wood powder, newsprint material, paper chips or powder, sawdust or their mixtures. Most preferably the porous material is newspaper or old corrugated cardboard (OCC). The conversion of the fibrous porous agent to a useful reactive additive or filler for composites is carried out by treating the fibrous porous material with a low viscosity organic solution comprising a solvent selected from aromatic, aliphatic, ethers, esters, ketones, halogenated solvents and alcohols, an isocyanate component being a mon- or poly-isocyanate and an unsaturated resin. The low viscosity organic solution may further comprise one or more compounds selected from an organic peroxide, styrene monomer, oligomer or polystyrene, and vinyl containing monomers. The unsaturated resin may be a hydroxyl or carboxyl containing unsaturated polyester resins which may be aromatic. The treating solution treats the entire porous material (FIG. 2B) unlike known compatibilizers, which modify only the surface while the inner porous structure, is untreated as demonstrated in FIG. 2A (prior art). The organic solution with its contents hereinafter defined as CCA (Cycletec Coupling Agent) may be regarded as a compatibilizer that effectively interfaces each and every fiber and not only the outer surface. Unlike polymeric compatibilizers that are miscible in the polymeric ingredients, thus a competition between phases and interphases occurs, the CCA treated porous fibers/powders, function as reinforcement and compatibilizer at the same time. A fibril that has multyfunctionality and crosses two phases, reinforce them but also limit their tendency to separate. The composite material is comprised of a polymeric matrix and the treated fibrous porous material. The matrix may be thermoplastic or thermosetting polymers. A good source for low cost plastics for making such composites is plastic waste, especially post consumer waste.

Thus the present invention makes use of a reactive, low cost, highly penetrating coupling agent, with strong, hydrolytic stable and tough backbone, and a wide spectrum of molecular weights, from 100 Dalton to 100000 Dalton. It has the simplicity of application of coupling agent with the compatibilization capability of high molecular weight compatibilizers. The mode of action of the compatibilizer of the present invention is that the unsaturated polyester react with polyolefines due to grafting reaction initiated by peroxide at elevated temperatures, and with thermoplastic polyesters due to trans-esterification, and reinforce the internal porous nanostructure of the fibers, thus eliminate the need to mix very aggressively with the thermoplastic matrix. The isocyanate compound reacts rapidly with the hydroxyls in the filler, and with the hydroxyl or carboxyl groups in the unsaturated polyester, thus acts as a coupling agent and as a crosslinker to the polyester. A covalent bond is created between the cellulose and the polyester-isocyanate network. Due to the high affinity of the isocyanate to the hydroxyl groups, the resulting treated filler is extremely hydrophobic and hydrolytically stable. The aromatic nature of the unsaturated polyester and of the MDI based isocyanate are responsible to the outstanding chemical and hydrolytic stability. The Styrene monomer functions as a solvent/carrier and react with styrenic polymers in the matrix (thus function as coupling agent) and, with the lignin phase in the filler. The resulting treated fibrous porous material is a composite nano/microstructure that has balanced properties from the nano scale to the macroscopic scale. Due to the high reactivity of the styrene and the unsaturated poyester, the treated fibrous porous material is reactive with Polyolefines, Styrenics, Vinyl polymers, PET and Polyuretahane. The amount of added solvent forming the treating solution is from about 0.01 to about 20 g. For each 100 g of fibrous porous material, and from about 0.1 g. to about 25 g. of the solution for each 100 g. of fibrous porous material.

It should be understood that the inner part of the fibrous porous material treated by CCA is modified. The inner fibril or particle, which are untreated by common compatibilizer, is chemically modified and physically reinforced by the solvent assisted system. Furthermore, the pores between fibers, which are left untreated by the compatibilizer of the prior art due to the fact that the compatibilier cannot penetrate inside, are filled/modified by the various ingredients so as to form an inner cross-linked nanocomposite network. In addition, the filing of the pores derives water and humidity out from the pores. The reduced surface area, the limited permeability to oxygen and the urethane groups, make the treated cellulose resistant to oxidation and much less flammable. This major change in the inner part of the fibrous porous material has significant benefits.

Following the treatment of the fibrous porous material with CCA, the solvent may be removed. The resulting treated material, which may be a powder or chip depending on the starting material, which can be regarded as a stand alone product is hydrophobic and may be stored at ambient temperature for a period of a few months with no decrease in the chemical reactivity. The water uptake is negligible, even when high surface area cellulosic powders are treated.

The CCA treatment reduced dramatically the surface area and the permeability of oxygen thus cellulose based fillers and fibers treated by CCA are less flammable and the composites made from are less flammable, and the tendency of the filler to burn during mixing/molding, is minimized. Moreover, the CCA contains cyanurate forming groups thus create a potentially intumescing flame retardant (FR).

The fibrous material is dry, hydrophobic and does not have to be dried prior to the conduction of the next step of reaction with the polymer to form the composite material. Such a pre-drying stage is expensive and is a known bottleneck in the process of composites made from plastics and cellulose fillers-woodflour for example.

Due to the fact the CCA treated fibers are highly reactive, a compatibilization take place during short residence times with the molten plastics. There is no need for application of massive mechanical energy and expensive dedicated equipment (usually co/counter/conical twin screw extruder) to force the molten polymer into the fibrous porous material, the CCA treated filler/fiber is created at ambient conditions with minimal or any mechanical energy. Unlike other cellulose filled composites that require aggressive and expensive extruders—mostly high L/D twin screws, the CCA process needs only 5–20% of the energy and can be manufactured in all extrusion machines including short L/D, single screws which are dramatically cheaper in capital cost and energy consumption.

The fact that the treated fiber is already a composite material by itself, enables the use of coarse chips or powder thus save massive milling energy usually involved in prior art. The treatment of the fibrous porous material can be done on 2–10 mm granulated chips or powder. Due to the high degree of modification and impregnation, very simple and cost-effective mixing machines are possible (dry blend with polymer powder followed by heating and molding or single screw extruder or single screw continues mixer). FIGS. 4–7 demonstrate some non-limiting possible production processes, which may be carried out.

The invention will now be described by the following non-limiting examples.

EXAMPLES

Example 1

Composite Sheet Made from CCA Treated Newsprint and Granulated Commingled Post Consumer Plastic, by Compression Molding Cyletec Coupling Agent 1 (CCA1, produced by Cycletec Ltd., Israel) was prepared. The CCA1 was obtained by mixing 2.37 kg Unsaturated polyester resin containing hydroxyl and/or carboxyl reactivity, 120 gr Polyisocyanate (MDI oligomer), 36 gr of organic peroxide (Dicumyl peroxide) and 630 gr of organic solvent (butyl acetate) The solution was mixed with 21.8 kg. of newsprint chips (2–5 mm), in planetary mixer at ambient temperature for 10 minutes. 25.7 kg. of post consumer plastic mixture (90% HDPE, 5% PP, 5% packaging multilayered material) chopped to 2–5 mm chips were added and mixed for 10 min. The Butyl acetate was regenerated by vacuum/condensation at 80° C. The mixture was heated to 135° C. under a pressure of 10 atm. for 5 min. to create a packed Preform. The Preform was heated to 150° C. for 45 minutes in convention oven until all polymer chips were softened and tacky, and pressed at 180° C. under a pressure of 45-atm. for 5 minutes and the demolding temperature was 70° C. The material is stiff with flexural modulus of 2550 Mpa and flexural strength of 45 Mpa. Water absorption is less than 0.5% (despite the fact that about 50% of the material is cellulose).

Unlike standard cellulose based composites that suffer from oxidation (burning) of the cellulose, during molding—this composite material was bright-colored and had no smell of smoke.

Very similar results were achieved when a virgin HDPE was used as the polymer matrix.

Example 2

Composite Material Made from CCA Treated Newsprint and Polyethylene, by Extrusion Compounding (Reference to Cycletec Compound CD-10)

Figure 8A:
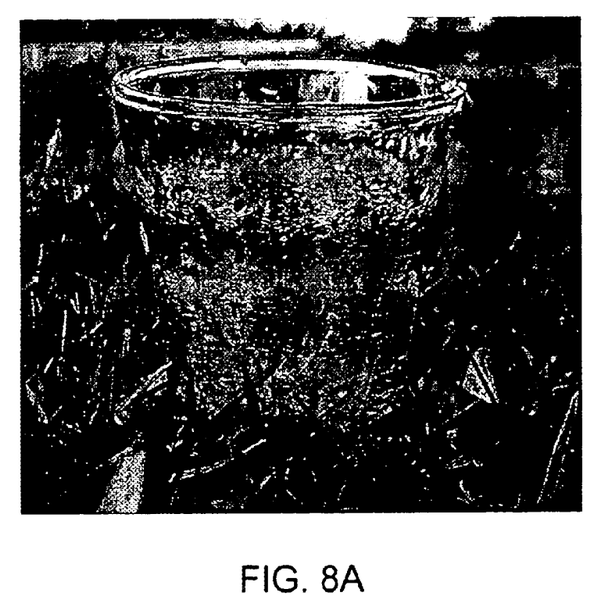
FIGS. 8A and 8B show a comparison between regular paper and paper treated according to the invention by means of their water absorption.
Figure 8B:
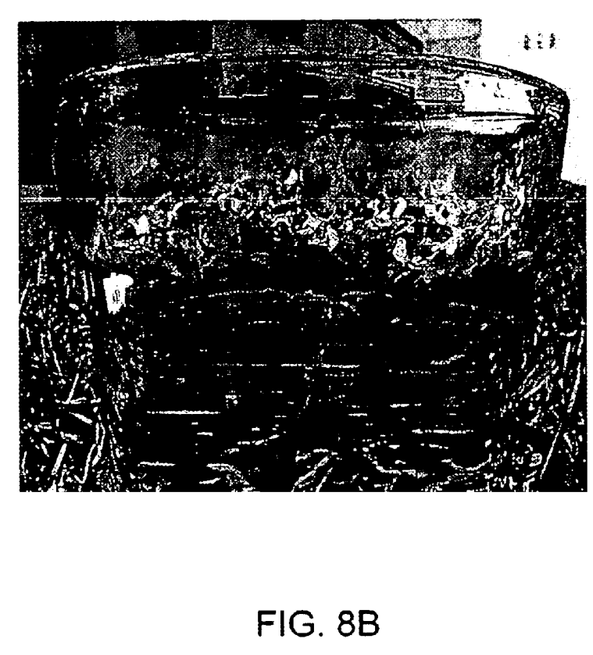

Cycletec Coupling Agent (CCA, produced by Cycletec Ltd., Israel) was prepared. The CCA was obtained by mixing 2.37 kg Unsaturated polyester resin containing hydroxyl and/or carboxyl reactivity, 120 gr isocyanate (MDI olygomer), 36 gr of organic peroxide (Dicumyl peroxide) and 630 gr of organic solvent (Butyl Acetate) The solution was mixed with 21.8 kg. of newsprint chips (2–5 mm), in planetary mixer at ambient temperature for 10 minutes. The Butyl acetate was regenerated by vacuum/condensation at 80° C. The resulting treated material is hydrophobic as can be understood from comparing the adsorption/sinking of untreated newsprint in water to the total floating of the CCA treated newsprint (see FIG. 8)

The mixture was fed into co-rotating twin screw extruder (Sinoalloy, 50 mm, temp. 150–200° C. along the extruder) with HDPE resin and processing aid (68.5% HDPE resin, MFI=6+1.5% LDPE resin as lubricant+30% CCA treated newsprint) and shaped into 3 mm diameter stands and cut to 3–5 mm pellets. The pellets were dried at 100 C. for 12 hrs, then re-heated to 180° C., and molded at 140° C. (mold temperature), 8 ton force for 30×30 mold size, held for 5 min. Demold temperature was 90° C.

The obtained material is stiff and strong with flexural strength of 35 Mpa, modulus of 1545 Mpa and very smooth shiny consistency. The water absorption after 24 hrs. at ambient was 0.1–0.4%.

Example 3

Composite Material Made from 30% CCA Treated Newsprint and 70% Commingled Polyolefin Plastic Scrap (Reference to Cycletec Compound CD-73)

CCA composition: 500 gr of unsaturated polyester (resin 555 by Makhteshim)+200 gr MDI isocyanate resin (Desmodur 44/20 MDI by Bayer)+7 gr Dicumyl peroxide+ 100 gr Butyl acetate. The CCA was sprayed by airless atomizer onto 10 kg paper (2–5 mm dry newsprint chips) during mixing in planetary mixer. The mixture was mixed for further 10 minutes and dried at 100 C. for 4 hrs. The treated newsprint chips were mixed with plastic granules obtained from blow molded colored bottles (90–95% HDPE) at ratio of 30% weight newsprint and 70% weight plastic in co-rotating twin screw extruder (Sinoalloy, 50 mm, temp. 150–200° C. along the extruder) into 3 mm diameter strands and cut to 3–5 mm pellets. The pellets were dried at 100° C. for 12 hrs, then injection molded by standard machine to give doge-bone shaped samples with very smooth consistency with no burning of paper. The properties of the molded sheets are:

| Flexural strength (Mpa) | Flexural Modulus (Mpa) | Tensile strength (Mpa) | Tensile Modulus (Mpa) | Elongation at break % | Notched Izod Impact (J/m) | applications |
|---|---|---|---|---|---|---|
| 45–50 | 2000–2200 | 25–30 | 2300–2500 | 3–5 | 70–100 | Injection molding, extrusion, compression molding |

Example 4

A Composite Material Made from 50% CCA Treated Newsprint and 50% PP Copolymer (Reference to Cycletec Compound CD-82)

CCA composition: 500 gr of unsaturated polyester (resin 555 by Makhteshim)+200 gr MDI isocyanate resin (Desmodur 44/20 MDI by Bayer)+7 gr Dicumyl peroxide+100 gr Butyl acetate. The CCA was sprayed by airless atomizer onto 10 kg paper (2–5 mm dry newsprint chips) during mixing in planetary mixer. The mixture was mixed for further 10 minutes and dried at 100 C. for 4 hrs. The treated newsprint chips were mixed with PP granules (Capilene SU75AV by Carmel Olefins, Israel) at ratio of 50% weight newsprint and 50% weight plastic in co-rotating twin screw extruder (Sinoalloy, 50 mm, temp. 150–230 C along the extruder) into 3 mm diameter stands and cut to 3–5 mm pellets. The pellets were dried at 100 C for 12 hrs, then injected molded by standard machine to give dog-bone shaped samples with very smooth consistency with no burning of paper. The properties of the resulting composites are:

| Flexural strength (Mpa) | Flexural Modulus (Mpa) | Tensile strength (Mpa) | Tensile Modulus (Mpa) | Elongation at break % | Notched Izod Impact (J/m) | applications |
|---|---|---|---|---|---|---|
| 40–45 | 2300–2700 | 20–25 | 2700–3100 | 2–3 | 40–50 | Injection molding, extrusion, compression molding |

Example 5

A Wood like Composite Material Made from CCA Treated OCC (Old Corrugated Cardboard) and PP Copolymer (Reference to Cycletec Compound CD-118)

CCA composition: 600 gr of unsaturated polyester (resin 555 by Makhteshim)+100 gr MDI isocyanate resin (Desmodur 44/20 MDI by Bayer)+7 gr Dicumyl peroxide+100 gr Butyl acetate. The CCA was sprayed by airless atomizer onto 10 kg paper (0.5 mm dry OCC powder) during mixing in planetary mixer. The mixture was mixed for further 10 minutes, and Talc powder was added (170 gr), and dispersed on the wet powder. The talc increases the flow of the powder and prevents bridging problems during feeding to extruder. The treated fibers were dried at 100° C. for 4 hrs. The treated paper powder were mixed with PP granules (Capilene SU75AV by Carmel Olefines, Israel) at ratio of 35 weight powder and 70 weight plastic in co-rotating twin screw extruder (Sinoalloy, 50 mm temp. 150–230° C. down the extruder) into 3 mm diameter strands and cut to 3–5 mm pellets. The pellets were dried at 100° C. for 12 hrs, then injected molded by standard machine to give doge-bone shaped samples with very smooth consistency with no burning of paper. The properties of the resulting composites are:

| Flexural strength (Mpa) | Flexural Modulus (Mpa) | Tensile strength (Mpa) | Tensile Modulus (Mpa) | Elongation at break % | Notched Izod Impact (J/m) | applications |
|---|---|---|---|---|---|---|
| 40–45 | 2300–2700 | 20–25 | 2700–3100 | 2–3 | 45–50 | Injection molding, extrusion, compression molding |

Example 6

Composite Material Made from Treated Newsprint, and Commingled Plastics as Granulated Scrap (PVC/ABS/PE/PS) by Simple Mixing at Ambient, and Compression Molding Cycletec Coupling Agent 1 (CCA1, produced by Cycletec Ltd., Israel) was prepared. The CCA1 was obtained by mixing 2.37 kg Unsaturated polyester resin containing hydroxyl and/or carboxyl reactivity, 120 gr Polyisocyanate (MDI olygomer), 36 gr of organic peroxide (Dicumyl peroxide) and 630 gr of organic solvent (butyl acetate) The solution was mixed with 21.8 kg. of newsprint chips (2–5 mm), in planetary mixer at ambient temperature for 10 minutes. The Butyl acetate was regenerated by vacuum/condensation at 80° C. mixed plastic chips (couples of two immiscible polymer—see table) were introduced and the mixture was blended at planetary mixer for further 10 minutes. The resulting mixture was pressurized under a pressure of 10 atm. at a temperature of 35° C. for 5 minutes to create a packed preform. The Preform was preheated to 150° C. and pressurized at 180° C. under a pressure 45 atm. for 50 min. The demolding temperature was 70° C. The mechanical properties are described in Table I.

TABLE I

Physical properties of starting materials and composite materials obtained in Examples 1 to 4:

| Description | Flexural Strength (Mpa) | Flexural Modulus (Mpa) |
|---|---|---|
| ABS (MFI 11)-blank (without newsprint) | 43.49 | 1409 |
| ABS/45% Paper-without treatment with CCA1 | 25.59 | 1968 |
| ABS/Paper + (treated by CCA1) | 41.62 | 3395 |
| [ABS:HDPE(50:50)]/45% Paper (CCA treated) | 38.12 | 2776 |
| PS | 40.84 | 2196 |
| PS/45% Paper without treatment with CCA1 | 15.27 | 1670 |
| PS/Paper + CCA | 29.17 | 3591 |
| HDPE (MFI 7) | 21.74 | 818.4 |
| [PS:HDPE(50:50)]/45% Paper (CCA treated) | 40.25 | 3282 |
| PVC (unplasticized) | 22.76 | 2912 |
| [PVC:HDPE(50:50)]/45% Paper-without treatment | 23.18 | 2938 |
| PVC:HDPE(50:50)/40% Paper (CCA treated) | 51.78 | 3914 |
| PP (MFI 10) | 33.18 | 3118 |
| PP/45% Paper (CCA treated) | 34.77 | 3090 |

Example 7

A Composite Structure Made from Treated Newsprint, PVC/ABS/PE/PS by Simple Mixing at Ambient Temperature, and Reinforced Skin Made from Unsaturated Polyester/Glass Material A mixture of Derakane® (510A-40 by Dow), 1% (w/w) dicumyl peroxide and 5% (w/w) antimony trioxide were applied over a nonwoven E-glass (Owens, 255 gr/m$^2$). A composite material obtained as in example 1 is laminated by the pre-preg (a tissue of reinforced fiber, impregnated by theroset resin in α-stage or β-stage) at temperature of 165° C. resulting in a sandwich structure shown in FIG. 2. The physical properties of the resulting structure are: Flexural strength of 60.31 Mpa, Flexural modulus of 4468 Mpa and the impact is 2 times better than the original core. Flame resistance: the original core material is burning after ignition of 15 seconds. The unreinforced version (Derakane skin over standard core), burn for 10 seconds, and fire was running into the cracks on surface. The reinforced version, stopped fire immediately after the flame was removed (V-0).

Example 8

Composite Material Made from Semi Flexible, Low Cost CCA Treated Newsprint and HDPE Scrap (Reference to Cycletec Compound CD-104)

CCA Composition: 300 gr of unsaturated polyester (resin 44383 by Reichhold)+300 gr unsaturated polyester (resin 31830 by Reichhold) 100 gr MDI isocyanate resin (Desmodur 44/20 MDI by Bayer)+7 gr Dicumyl peroxide+ 100 gr Butyl acetate. The CCA was sprayed by airless atomizer onto 10 kg paper (2 mm dry newsprint chips) during mixing in planetary mixer. The mixture was mixed for further 10 minutes, and dried at 100° C. for 4 hrs. The treated paper powder were mixed with HDPE scrap derived from bottles as granules (From Amnir, Israel) at ratio of 30 weight CCA treated paper and 70 weight plastic in co-rotating twin screw extruder (Sinoalloy, 50 mm temp. 150–230° C. down the extruder) into 3 mm diameter strands and cut to 3–5 mm pellets. The pellets were dried at 100° C. for 12 hrs, then injected molded by standard machine to give doge-bone shaped samples with very smooth consistency with no burning of paper. The properties of the resulting composites are summarized below:

| Flexural strength (Mpa) | Flexural Modulus (Mpa) | Tensile strength (Mpa) | Tensile Modulus (Mpa) | Elongation at break % | Notched Izod Impact (J/m) | applications |
|---|---|---|---|---|---|---|
| 35–40 | 1500–2500 | 20–25 | 1500–2500 | 3–5 | 70–110 | Injection molding, extrusion, compression molding |

Example 9

A Composite Material Made from 25% CCA Treated Newsprint and 75% PP Copolymer for Automotive Interior Trims (Reference to Cycletec Compound CD69)

CCA composition: 600 gr of unsaturated polyester (resin 555 by Makhteshim)+100 gr MDI isocyanate resin (Desmodur 44/20 MDI by Bayer)+7 gr Dicumyl peroxide+ 100 gr Butyl acetate. The CCA was sprayed by airless atomizer onto 10 kg paper (2–5 mm dry newsprint chips) during mixing in planetary mixer. The mixture was mixed for further 10 minutes and dried at 100 C. for 4 hrs. The treated newsprint chips were mixed with plastic granules of PP copolymer (Capilene SU 75AV by Carmel olefins, Israel) at ratio of 25% weight newsprint and 75% weight plastic in co-rotating twin screw extruder (Sinoalloy, 50 mm, temp. 150–200 C along the extruder) into 3 mm diameter stands and cut to 3–5 mm pellets. The pellets were dried at 100 C for 12 hrs, then injection molded by standard machine to give doge-bone shaped samples with very smooth consistency with no burning of paper. The properties of the molded sheets are summarized below:

| Flexural strength (Mpa) | Flexural Modulus (Mpa) | Tensile strength (Mpa) | Tensile Modulus (Mpa) | Elongation at break % | Notched Izod Impact (J/m) | applications |
|---|---|---|---|---|---|---|
| 35–45 | 2200–2500 | 23–26 | 2800–4600 | 2–5 | 40–50 | Injection–molding, compression molding |

The impact was also tested by falling dart apparatus (Dynatup machine, ASTM D-3763-00). The results are summarized in the table below:

| Formulation | Thickness | Energy to max. load (joule) | Energy to break (joule) |
|---|---|---|---|
| CD-69, 230° C. molding temperature | 4.1672 | 5.9606 | 6.9723 |
| CD-69, 210° C. molding temperature | 3.7451 | 6.9072 | 9.0278 |
| SU75AV, 230° C. molding temperature | 3.8061 | 7.1569 | 8.3420 |

Figure 9A:
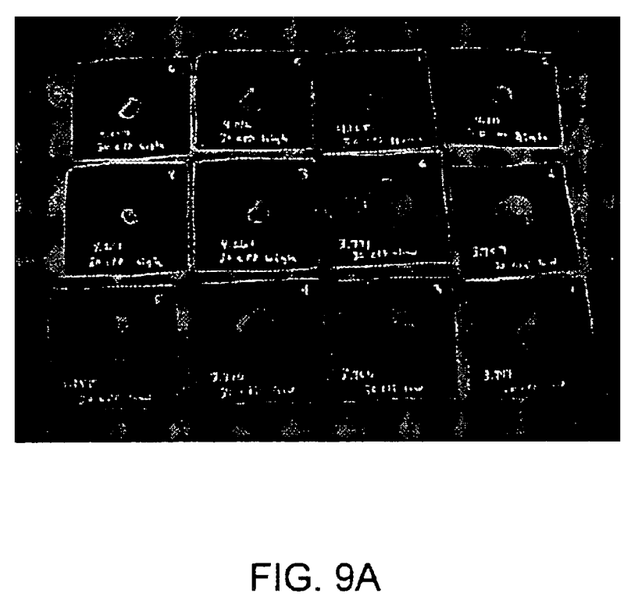
FIGS. 9A and 9B show a comparison between a composite of the prior art (polypropylene based composite with cellulose) and composite obtained according to the invention by means of their impact.
Figure 9B:
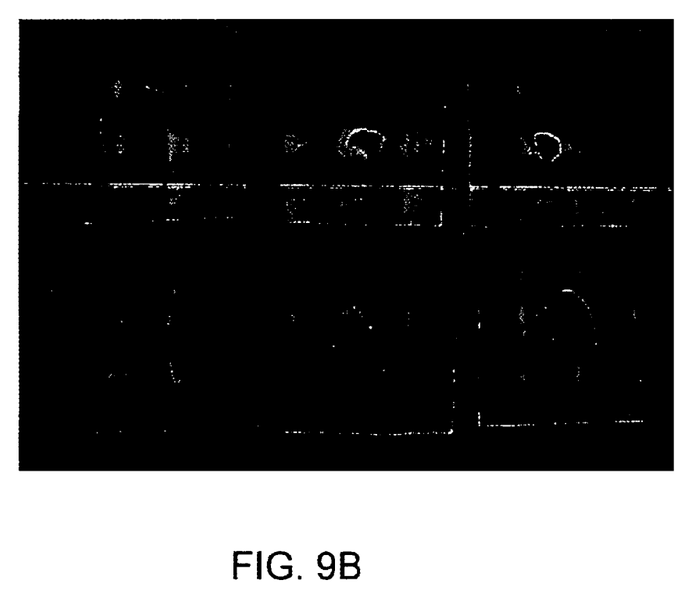

It is evident that the introduction of short newsprint fibers into the PP matrix, caused minor deterioration in the impact resistance. Lower temperature molding gives better properties, due to the better homogeneity during flow. Another important issue is the toughness as can be seen in FIGS. 9A and 9B. It is evident that cracks are propagating in catastrophic mode in the neat PP (9A), but are localized and minimized at the CCA treated paper PP composite (9B).

Figure 10A:
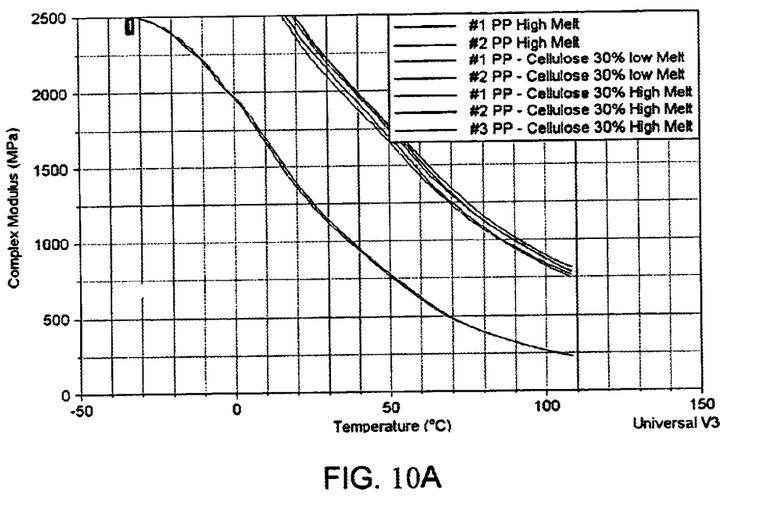
FIGS. 10A and 10B show profiles of heat distortion temperatures of composites according to the present invention and known commercial polymers.
Figure 10B:
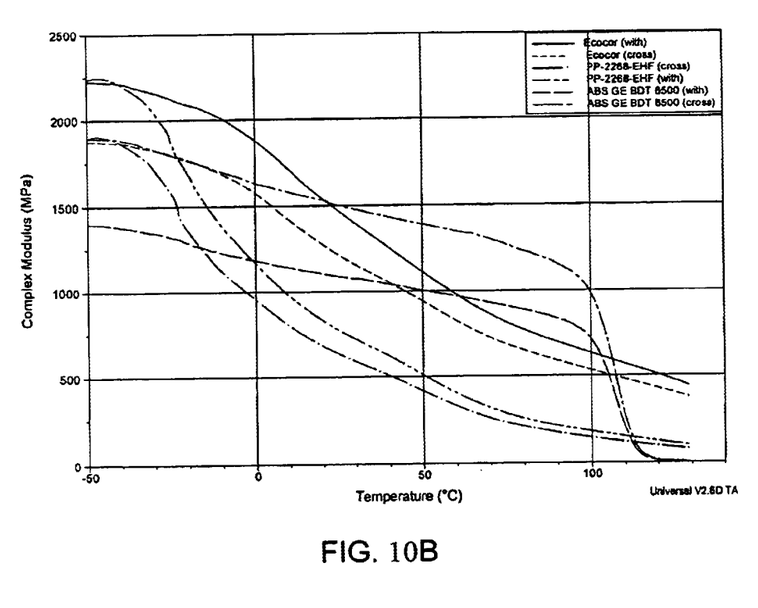

Another important property of the CCA treated paper PP composite is the resistance to bending and deflection at elevated temperatures, an important property for automotive applications. FIGS. 10A and 10B show CCA treated paper PP composite has rigidity at 90° C., which is, like styrenic polymers.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A treated fibrous porous material obtainable from an untreated porous fibrous material containing original hydrophilic reactive sites by
   (i) treating the untreated porous fibrous material with a low viscosity organic solution consisting of:
      (a) a solvent selected from the group consisting of aromatics, aliphatics, ethers, esters, ketones, halogenated solvents and alcohols;
      (b) an isocyanate component being a mono- or polyisocyanate;
      (c) an organic peroxide activated at elevated temperature;
      (d) an unsaturated polyester resin which is hydroxyl epoxy or carboxyl containing; and
      (e) styrene monomer;
   wherein said treated fibrous porous material comprises 80 to 99% (w/w) of said fibrous porous material; 1 to 12% (w/w) of said unsaturated polyester resin; 0.1–5% (w/w) of said styrene monomer; 0.4 to 3% (w/w) isocyanate; 0.05 to 0.2% (w/w) of said organic peroxide; and 0.75 to 5% (w/w) of said solvent; and
   (ii) forming a treated fibrous porous material whose original reactive hydrophilic sites are covalently bonded to said isocyanate via urethane, allophanate or biuret bonds, and said isocyanate is further coupled to said unsaturated polyester resin via urethane, allophanate or biuret bonds, wherein said treated fibrous porous material contains said organic peroxide activated at elevated temperature, said styrene monomer and said unsaturated polyester resin therein.

2. A treated fibrous porous material according to claim 1, wherein said styrene is bound to said treated fibrous porous material.

3. A treated fibrous porous material according to claim 1, wherein said untreated porous fibrous material is selected from the group consisting of wood, paper, bio fibers, porous powders of biological origin and mixtures thereof.

4. A treated fibrous porous material according to claim 3, wherein said untreated porous fibrous material is cellulose based natural matter.

5. A treated fibrous porous material according to claim 4, wherein said cellulose is in the form of wood chips, recycled paper, paper chips, paper powder, sawdust or mixtures thereof.

6. A treated fibrous porous material according to claim 5, wherein said untreated porous fibrous material is newsprint paper.

7. A treated fibrous porous material according to claim 1, wherein said untreated porous fibrous material is 2 to 10 mm granulated chips or powder.

8. A composite material comprising a treated fibrous porous material according to claim 1 and at least one polymer, wherein said composite material is obtainable by continuously mixing a molten polymer with said treated fibrous porous material at a temperature of 165–230° C., said stored organic peroxide decomposing to free radicals and crosslinking said unsaturated polyester resin and said styrene stored therein, further forming a covalent bond between said molten polymer and said unsaturated resin and/or polystyrene via a grafting reaction.

9. A composite material according to claim 8, wherein said at least one polymer comprises one or more polymers selected from the group consisting of thermoplastic polymers, thermosetting polymers and mixtures thereof.

10. A composite material according to claim 9, wherein said polymer is one or more selected from the group consisting of polyethylene and copolymers thereof, polypropylene and copolymers thereof, and mixtures thereof.

11. A composite material according to claim 8, wherein said polymer is from industrial or domestic waste.

12. A product made from a composite material according to claim 8.

13. A product according to claim 12, wherein said product comprises an extrusion, in-line extrusion product, injection molding, an in-line injection product or pellets.

14. A product according to claim 13, wherein said product comprises a plate, a board, a transportation pallet, a film, an automotive interior trim or a construction element.

15. A preform manufactured from the composite material of claim 8, wherein said preform is formed by shaping into a mold, roll or continuous belt, to yield a sheet made of said composite material, or by impregnating said composite material into a woven or non-woven fabric, to yield a sheet made of said fabric and said composite material.

16. A composite structure manufactured by heating at least one preform of claim 15 to a softening point and pressing the pre-heated sheet in a mold, or manufactured by heating two or more different preforms of claim 15 to a softening point and pressing said pre-heated sheets in a mold to yield a multilayered structure.

17. A composite structure according to claim 16, wherein said softening point ranges from about 130° C. to about 230° C.

18. A composite material according to claim 8, wherein said composite material comprises a multilayered product, a multicomponent product or combinations thereof.

* * * * *